United States Patent
Waful et al.

(10) Patent No.: US 11,125,565 B1
(45) Date of Patent: Sep. 21, 2021

(54) SYSTEMS AND METHODS FOR POSITION-BASED BUILDING GUIDANCE

(71) Applicant: United Services Automobile Association (USAA), San Antonio, TX (US)

(72) Inventors: Christopher James Waful, San Antonio, TX (US); Rachael Ann Humphreys, San Antonio, TX (US); Xin Wang, San Antonio, TX (US); Mateusz Peter Dyl, San Antonio, TX (US); Matthew Blair, San Antonio, TX (US); Andre Rene Buentello, San Antonio, TX (US); Paul Garcia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/908,160

(22) Filed: Jun. 22, 2020

Related U.S. Application Data

(63) Continuation of application No. 16/057,494, filed on Aug. 7, 2018, now Pat. No. 10,724,867.

(60) Provisional application No. 62/542,088, filed on Aug. 7, 2017.

(51) Int. Cl.
*G01C 21/20* (2006.01)
*G06F 16/29* (2019.01)

(52) U.S. Cl.
CPC ........... *G01C 21/206* (2013.01); *G06F 16/29* (2019.01)

(58) Field of Classification Search
CPC .............................. G01C 21/206; G06F 16/29
See application file for complete search history.

(56) References Cited

U.S. PATENT DOCUMENTS

| | | | |
|---|---|---|---|
| 9,877,266 B1 * | 1/2018 | Knas | H04W 40/244 |
| 9,877,298 B1 | 1/2018 | Knas et al. | |
| 10,197,401 B1 * | 2/2019 | Hsu | G09F 19/22 |
| 2014/0162695 A1 * | 6/2014 | Jeon | H04W 4/029 |
| | | | 455/456.3 |
| 2015/0018011 A1 | 1/2015 | Mendelson | |
| 2016/0049064 A1 * | 2/2016 | McNabb | G08B 21/10 |
| | | | 340/540 |
| 2016/0162695 A1 | 6/2016 | Scafaria et al. | |
| 2017/0083275 A1 * | 3/2017 | Shin | G09G 5/12 |
| 2017/0201709 A1 * | 7/2017 | Igarashi | H04N 5/23216 |

\* cited by examiner

*Primary Examiner* — Yazan A Soofi
*Assistant Examiner* — Naeem Taslim Alam
(74) *Attorney, Agent, or Firm* — Fletcher Yoder, P.C.

(57) ABSTRACT

The present disclosure relates to system that includes a database including data associated with one or more building features of a building. The system includes a processor of a computing device. The processor is configured to determine an absolute position of the computing device within the building. The processor is configured to identify at least one of the building features located within a threshold distance of the absolute position of the computing device based on a query of the database. Additionally, the processor is configured to generate an alert configured to cause the computing device to display information associated with the at least one of the building features or output an audible signal associated with the at least one of the building features.

20 Claims, 6 Drawing Sheets

SYSTEMS AND METHODS FOR POSITION-BASED BUILDING GUIDANCE

CROSS-REFERENCE TO RELATED APPLICATIONS

This application is a continuation of U.S. application Ser. No. 16/057,494, entitled "SYSTEMS AND METHODS FOR POSITION-BASED BUILDING GUIDANCE," filed Aug. 7, 2018, which claims priority to and the benefit of U.S. Provisional Application No. 62/542,088, entitled "SYSTEMS AND METHODS FOR POSITION-BASED BUILDING GUIDANCE," filed Aug. 7, 2017, each of which is hereby incorporated by reference in its entirety for all purposes.

BACKGROUND

The present disclosure relates generally to systems and methods for position-based building guidance. More specifically, the present disclosure relates to generating alerts for users to provide information related to building features that may be within a close proximity to the user.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Modern buildings or campuses may be large, widespread facilities that include various features located at large distances relative to one another. As such, signs or other physical visual navigation information may be posted within a building to help direct users to desired features of the building. However, the signs or physical visual navigation information may be omitted in some buildings or may be inaccessible to certain visually-impaired users. To better inform users so they may more efficiently navigate the building, it may be beneficial to improve the manner in which navigation information is provided to users of a building.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a database including data associated with one or more building features of a building. The system includes a processor of a computing device. The processor is configured to determine an absolute position of the computing device within the building. The processor is configured to identify at least one of the building features located within a threshold distance of the absolute position of the computing device based on a query of the database. Additionally, the processor is configured to generate an alert configured to cause the computing device to display information associated with the at least one of the building features or output an audible signal associated with the at least one of the building features.

In another embodiment, a method includes determining, via a processor of a computing device, one or more relative positions of the computing device to one or more routers, one or more communication beacons, or a combination thereof. The method includes determining, via the processor, an absolute position of the computing device within a building based on the one or more relative positions. The method includes querying, via the processor, a database including data associated with one or more building features of the building based on the absolute position. The method also includes identifying, via the processor, at least one of the building features located within a threshold distance of the absolute position based on the query. The method includes retrieving, via the processor, information associated with the at least one of the building features from the database. Additionally, the method includes generating, via the processor, a visualization for display on the computing device, audio for output via an audio component of the computing device, or both, wherein the visualization and the audio are indicative of the information.

In yet another embodiment, a non-transitory computer-readable medium includes computer-executable instructions configured to, when executed, cause a processor to determine an absolute position of a computing device within a building and to receive input indicative of a user request to schedule a meeting within one of the one or more meeting rooms. The computer-executable instructions are configured to cause the processor to query a first database based on the absolute position to identify at least one of the meeting rooms located within the threshold distance from the computing device. Additionally, the computer-executable instructions are configured to cause the processor to query a second database based on the at least one of the meeting rooms to determine an availability of the one or more meeting rooms, and generate an alert for display via the computing device. The alert is indicative of the availability of the one or more meeting rooms.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 2:
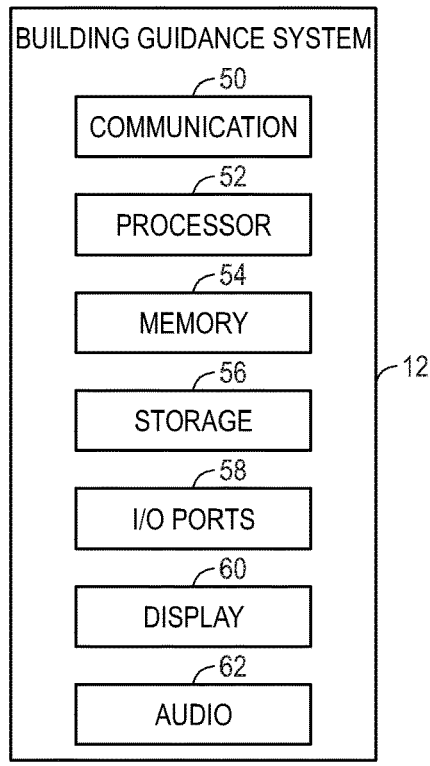
FIG. 2 illustrates a block diagram of a building guidance system that may be part of the computing system of FIG. 1, in accordance with embodiments described herein.
Figure 10:
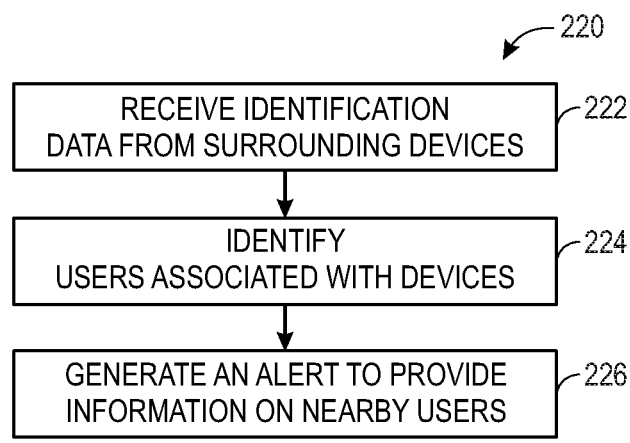
Figure 11:
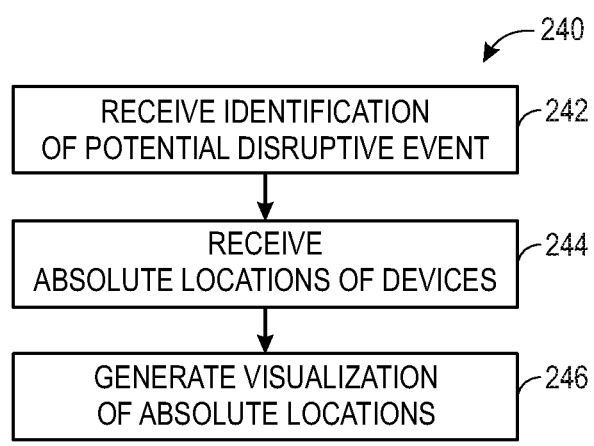

FIG. 10 illustrates a flow chart of a method for generating an alert via the building guidance system of FIG. 2 to provide information regarding nearby users, in accordance with embodiments described herein; and FIG. 11 illustrates a flow chart of a method for generating a visualization via the building guidance system of FIG. 2 to present positions of devices, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to generating alerts for individuals (i.e., users) within a building, near the building, or otherwise associated with the building to provide information related to certain building features via a building navigation system. When traveling or walking through a building, users may find it difficult to obtain information about certain building features (e.g., artwork, rooms, schedules, menus). For example, information regarding a building feature may be displayed in a visual form (e.g., sign), which may not be useful for visually-impaired users. As such, a building navigation system may be useful in providing information regarding building features based on a user's proximity to various building features. However, the use of standard navigation techniques, such as a global positioning system (GPS), may not be reliable within the building, thus limiting an ability of a computing device to recognize its position inside the building.

With the foregoing in mind, in certain embodiments, a building navigation system may generate alerts for the users via an electronic display or an audible output to provide information related to building features located within a proximity to the user. The alerts (e.g., visualizations, audio outputs) or may be modified in size, volume, and/or duration to be accessible to users of all ability levels. The alerts may be indicative of information associated with building features that may not be otherwise readily available to the users, such as information regarding artwork, cafeteria menus, nearby users, nearby available meeting rooms, or the like.

In some embodiments, the building navigation system may be a computing device (e.g., smart phone) that is associated with an individual (e.g., user). The building guidance system may determine an absolute position of the building guidance system within the building based on various communication equipment disposed throughout the building. The absolute position of the building guidance system may be a coordinate position within the building, such as a latitude position and a longitude position. Moreover, the absolute position may include an elevation position that may be useful for locating the building guidance system in a multi-floored building. To determine the absolute position, the building guidance system may rely on navigation devices such as routers, communication beacons, GPS, indoor GPS, or any suitable combination thereof to locate the position of the building guidance system within the building. Indeed, by using more than one type of navigation device, the building navigation system may operate with increased redundancy and accuracy.

Further, in some embodiments, the building navigation system may identify building features within a threshold distance or proximity of the absolute position of the building guidance system (e.g., nearby building features). For example, the building navigation system may query a building information database that includes identification information associated with building features, absolute positions of building features, and other interactive information associated with the building features. In some embodiments, the building navigation system may identify a subset of the building features that are within the threshold distance of the absolute position of the building guidance system. The building guidance system may then generate an alert to provide information associated with the nearby building features to the user. In this manner, the building guidance system may provide position-based information and interactive functions regarding nearby building features to users traveling through the building. Additional details regarding the building guidance system and various processes performed by the building guidance system will be described below with reference to FIGS. 1-11.

Figure 1:
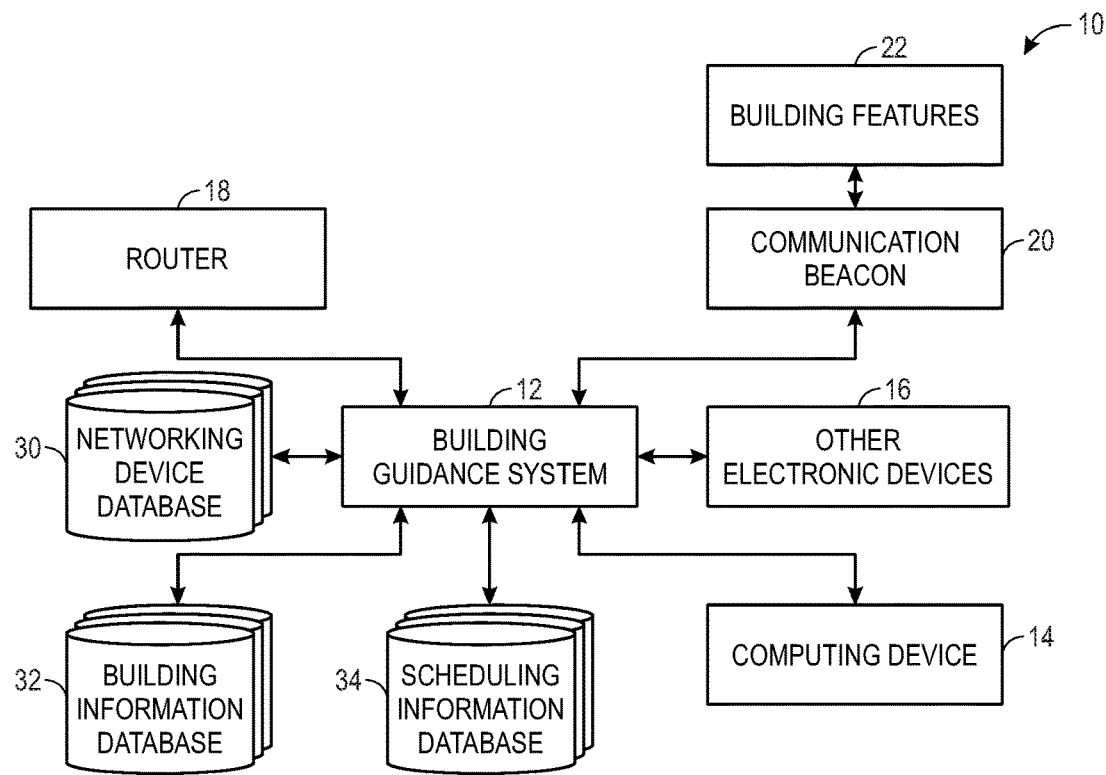
FIG. 1 illustrates a block diagram of a building guidance network for providing access to position-based information, in accordance with embodiments described herein.

By way of introduction, FIG. 1 illustrates a block diagram of a building guidance network 10 for providing access to position-based information, in accordance with present embodiments. The building guidance network 10 may enable a user to access information regarding a building, certain building features, and the like via a building guidance system 12 or another suitable computing device 14. The building guidance network 10 may additionally include other electronic devices 16, one or more routers 18, and one or more communication beacons 20 that may be associated with building features 22. Further, the building guidance network 10 may include one or more networking device databases 30, one or more building information databases 32, and one or more scheduling information databases 34.

Moreover, the databases 30, 32, 34 may be combined in any suitable manner or any other suitable databases may additionally or alternatively be included in the building guidance network 10.

Generally, the building guidance system 12 may be communicatively coupled to the networking device databases 30, the building information databases 32, and the scheduling information databases 34 via the building guidance network 10. The networking device databases 30 may include data or information regarding the routers 18, the communication beacons 20, and any other suitable networking devices included in the building guidance network 10. For example, the networking device databases 30 may include data regarding identification information related to various networking devices (e.g., routers, repeaters), physical positions of the networking devices within the building, signal strengths output by the networking devices, or the like. In certain embodiments, the communication beacons 20 may be placed on or nearby certain building features 22 to enable the building guidance system 12 to locate the certain building features 22.

The building features 22 may include various objects, rooms, and information regarding a building. For example, the building features 22 may include artwork displayed within the building, room designation or names throughout the building, reservation status of various rooms in the building, and the like. The building guidance system 12 may use the resources provided via the building guidance network 10 to obtain information that may be relevant to a user regarding the building features 22.

In some cases, a communication beacon 20 may be disposed on or fixed onto a building feature and transmit information regarding the building feature 22. The communication beacon 20 may include a radio or some suitable communication device (e.g., Bluetooth® device) that transmits signals interpretable by the building guidance system 12. The information regarding the building features 22 transmitted via communication beacons 20 may also be stored in the networking device databases 30, in the building information database 32, or in another suitable storage devices. In some embodiments, the building guidance system 12 may receive data from the networking devices (e.g., the routers 18, the communication beacons 20, etc.) and query the networking device databases 30 to determine the absolute position of the building guidance system 12 and nearby building features.

The building information databases 32 may include data or information regarding the building features within the building. For example, the building information databases 32 may include data regarding a map, physical structures, and physical coordinates associated with the building. Moreover, in buildings having multiple stand-alone structures, subparts, or regions, the building information database 32 may include visual information, audible information, and/or tactile information (e.g., Braille) associated with each stand-alone structure, subpart, or region. For example, a first region of the building may be associated with a first audible song, and a second region of the building may be associated with a second audible song. With this in mind, in some embodiments, after determining that the building guidance system 12 is in the first region of the building, the building guidance system 12 may play the first audible song through a selected audio device (e.g., within the building guidance system 12, via an intercom, etc.) As will be discussed in greater detail with reference to FIG. 7 below, if the building guidance system 12 then determines that it has moved to the second region, the building guidance system 12 may then query the building information database 32 to retrieve the second song, and then play the second song through the selected audio device.

Additionally, in some embodiments, the building information databases 32 include information related to positions and menus of cafeterias within the building. For example, the building information databases 32 may include data regarding identification information (e.g., name) related to the cafeterias, physical coordinates of the cafeterias, menus associated with the cafeterias, operating hours of the cafeterias, and the like. As such, the building guidance system 12 may query the building information database 32 to retrieve a position of the cafeteria and then determine whether the building guidance system 12 is within a threshold distance from a cafeteria, whether the building guidance system 12 is within a same region or subpart of the building as a cafeteria, or the like. Additionally, as will be discussed in greater detail with reference to FIG. 6 below, the building guidance system 12 may generate an alert in response to determining that a cafeteria is located within the threshold distance with respect to the building guidance system 12. The alert may include information regarding the menu associated with the cafeteria, as well as any other desired information stored in the building information database 32 regarding the respective cafeteria. In some embodiments, the menus may be updated and stored in the building information databases 32, such that the building guidance system 12 may receive up-to-date information of the menus while within the threshold distance from the cafeteria. Although described with reference to a cafeteria, it is to be understood that the building information database 32 may be modified to store information related to any store or service within the building, such as a book store, a coffee shop, a copy shop, a gift shop, or the like.

In some embodiments, the building information databases 32 may include information related to artwork (e.g., paintings, photographs, sculptures) within the building. For example, the building information databases 32 may include data regarding identification information (e.g., artist, date created, style) related to the artwork, descriptions of the artwork, artists of the artwork, physical coordinates of the artwork, communication beacons 20 associated with the artwork, or the like. In some embodiments, the artwork may include paintings, installations, sculptures, fountains, or other decorative or structural features of the building. As will be discussed in greater detail with reference to FIG. 8 below, the building guidance system 12 may generate an alert when the building guidance system 12 is within a threshold distance from the artwork, thus presenting position-based information related to the artwork to the user of the building guidance system 12.

Additionally, the scheduling information databases 34 may include data or information regarding meeting rooms within the building. For example, the scheduling information database 34 may include data regarding identification information related to the meeting rooms, physical positions of the meeting rooms within the building, communication beacons 20 associated with the meeting rooms, operating hours of the meeting rooms, statuses (e.g., available, unavailable, occupied, etc.) of the meeting rooms over various time periods, identification data regarding meetings that are scheduled within the meeting rooms, descriptive details related to the meeting rooms, features (e.g., projectors, computers, available seating, etc.) included in the meeting rooms, and the like. As such, the building guidance system 12 may generate an alert when the building guidance system 12 is within a threshold distance of a meeting room having an available status. Moreover, the building guidance system 12 may receive user input indicative of a user request to schedule a meeting within a nearby meeting room, and then locate meeting rooms within the threshold distance from the user that have an available status. In response to receiving user selection of the unoccupied meeting room for a selected time period, the building guidance system 12 may modify the status for the meeting room in the scheduling information database 34 to reflect that the meeting room has an unavailable status for the selected time period. As a result, the building guidance system 12 enables the user to schedule meetings based on their position within the building.

In certain embodiments, one or more of the components the building guidance network 10 may be part of a cloud-based computing system that includes a number of computers that may be connected through a real-time communication network, such as the Internet. In one embodiment, multiple building guidance systems 12 may be commutatively coupled with the cloud-based computing system (e.g., one building guidance system 12 for each user within the building).

In some embodiments, the building guidance system 12 is included or installed on the computing device 14. For example, the building guidance system 12 may be a software package, an application, or the like that is installed on the computing device 14. However, in some embodiments, the building guidance system 12 is a stand-alone device or another computing device that may communicate with the computing device 14. In some embodiments, the building guidance system 12 is a smart device, such as a phone, a tablet, a pair of smart glasses, a smart watch, or the like. In such embodiments, the building guidance system 12 may provide portable assistance to enable position-based navigation and provide information to the user within the building. Additionally, the building guidance system 12 may communicate with the building guidance systems 12 that are associated with other users within the building.

Moreover, the building guidance system 12 may be communicatively coupled to the other electronic devices 16 of the building guidance network 10. For example, the other electronic devices 16 may include display screens such as television (TV) screens, computer monitors, electronic display boards, and the like. The other electronic devices 16 may also include audio devices such as intercoms, speakers, and the like. In some embodiments, the other electronic devices 16 include any other suitable electronic device that may present information (e.g., visual information, audible information, tactile information) to users within the building.

Additionally, in certain embodiments, the building guidance system 12 is communicatively coupled to the one or more routers 18 (e.g., network device, gateway device). In some embodiments, the building guidance system 12 may be additionally or alternatively coupled to the one or more communication beacons 20 (e.g., network device). The routers 18 may operate as network devices or gateway devices to enable the building guidance system 12 to communicatively couple to the Internet and/or to the other components of the building guidance network 10. The routers 18 may be spaced within the building to enable the building guidance system 12 to couple to the Internet from any suitable position within the building. As such, by identifying the routers 18 that the building guidance system 12 is coupled to, the building guidance system 12 may determine a relative position of the building guidance system 12 to the routers 18. Moreover, as will be discussed below with reference to FIGS. 4 and 5, the building guidance system 12 may determine the absolute position of the building guidance system 12 based on its relative position to the routers 18. In a similar manner, the building guidance system 12 may communicatively couple to the communication beacons 20 to determine a relative position of the building guidance system 12 therefrom. Then, based on the relative position of the building guidance system 12 to the communication beacons 20 and/or the routers 18, the building guidance system 12 may determine an absolute position of the building guidance system 12 relative to the building.

To perform some or all of the actions described above, the building guidance system 12 may include certain components to facilitate performing these actions. FIG. 2 is a block diagram of example components within the building guidance system 12. For example, the building guidance system 12 may include a communication component 50, a processor 52, a memory 54, a storage 56, input/output (I/O) ports 58, a display 60, an audio component 62, and the like. The communication component 50 may be a wireless or wired communication component that may facilitate communication between components of the building guidance network 10, such as the building guidance system 12, the computing device 14, the other electronic devices 16, the routers 18, the communication beacons 20, the networking device databases 30, the building information databases 32, the scheduling information databases 34, and the like. The processor 52 may be any type of suitable computer processor or microprocessor capable of executing computer-executable code. Additionally, the processor 52 may also include multiple processors that may perform the operations described herein.

The memory 54 and the storage 56 may be any suitable articles of manufacture that can serve as media to store processor-executable code, data, or the like. These articles of manufacture may represent non-transitory, computer-readable media (e.g., any suitable form of memory or storage) that may store the processor-executable code used by the processor 52 to perform the presently disclosed techniques. The memory 36 and the storage 38 may also be used to store data, various other software applications, and the like. For example, the memory 54 and the storage 56 may store the processor-executable code used by the processor 52 to perform various techniques described herein, as well as code for other techniques as well. It should be noted that non-transitory merely indicates that the media is tangible and not a signal.

The I/O ports 58 may be interfaces that may couple to other peripheral components such as input devices (e.g., keyboard, mouse), output devices (e.g., headphones, vibration device), sensors, input/output (I/O) modules, and the like. The display 60 may operate to depict visualizations associated with software or executable code being processed by the processor 52. In one embodiment, the display 60 may be a touch display capable of receiving inputs from a user of the building guidance system 12. The display 60 may be any suitable type of display 60, such as a liquid crystal display (LCD), plasma display, or an organic light emitting diode (OLED) display, for example. Additionally, in one embodiment, the display 60 may be provided in conjunction with a touch-sensitive mechanism (e.g., a touch screen) that may function as part of a user interface for the building guidance system 12. Moreover, in one embodiment, the audio component 62 may be a speaker or another suitable device for presenting data audibly to the user. Moreover, in some embodiments, the audio component 62 includes a text-to-speech function that enables visual or text-based information to be translated to into an audible form. In some embodiments, a speech-to-text function may be included in the building guidance system 12 to translate audible information to visual or text-based information on the display 60. In this manner, the building guidance system 12 may increase an accessibility of information within the building to users therein.

It should be noted that the components described above with regard to the building guidance system 12 are exemplary components and the building guidance system 12 may include additional or fewer components as shown. Additionally, it should be noted that the computing device 14 or other computing devices may also include similar components as described as part of the building guidance system 12.

Figure 3:
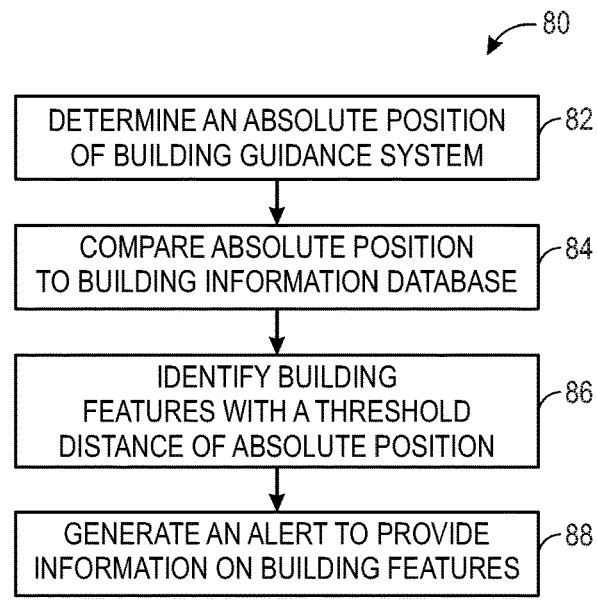
FIG. 3 illustrates a flow chart of a method for generating an alert via the building guidance system of FIG. 2 to provide information regarding building features, in accordance with embodiments described herein.

With the foregoing in mind, FIG. 3 illustrates a flow chart of a method 80 for generating an alert to provide information regarding building features via the building guidance system 12, in accordance with embodiments described herein. Although the following description of the method 80 is described in a particular order, which represents a particular embodiment, it should be noted that the method 80 may be performed in any suitable order. Moreover, although the following description of the method 80 is described as being performed by the building guidance system 12, it should be noted that the method 80 may be performed by any suitable computing device.

Referring now to FIG. 3, at block 82, the building guidance system 12 may determine an absolute position of the building guidance system 12. The absolute position may include latitude, longitude, and elevation coordinates, Cartesian coordinates (e.g., X, Y and Z), or another suitable coordinate system for objectively referencing the position of the building guidance system 12 with respect to the building. Additionally, the absolute position of the building guidance system 12 may be determined based on communication of the building guidance system 12 with the routers 18 and/or the communication beacons 20, as discussed in greater detail with reference to FIGS. 4 and 5 below. In some embodiments, the absolute position of the building guidance system 12 may be specified with respect to the building features 22 of the building, with respect to different locations of the building, and the like. That is, although the following description of the method 80 is detailed using the absolute location, it should be noted that the relative location of the building guidance system 12 with respect to certain building features may also be used in the method 80.

At block 84, the building guidance system 12 may compare the absolute position of the building guidance system 12 to the position of building features 22 stored in the building information databases 32. As discussed above with reference to FIG. 1, the building information databases 32 may include data related to building features 22, such as meeting rooms, cafeterias, other users, artwork, and other decorative or structural features of the building. Indeed, the data may include identification information such as names, serial numbers, identification numbers or codes, physical positions or coordinates, as well as other interactive data discussed herein.

At block 86, the building guidance system 12 may identify building features 22 (e.g., nearby building features) that are within a threshold distance of absolute position of the building guidance system 12. For example, the threshold distance may be a default or user-selectable distance, such as 50 meters, 100 meters, 200 meters, or another suitable distance. By querying the building information databases 32 based on the absolute position of the building guidance system 12, the building guidance system 12 may determine relative distances between each building feature 22 and the building guidance system 12. Then, the building guidance system 12 may determine a list of building features that have relative distances from the absolute position of the building guidance system 12 that are within the threshold distance. Moreover, in some embodiments, the building guidance system 12 may determine that building features 22 are within the threshold distance if they are in a same region or subpart of the building as the building guidance system 12.

In some embodiments, based on the identified building features 22 within the threshold distance from the building guidance system 12, the building guidance system 12 may generate an alert to provide information regarding the building features 22 located within the threshold distance. For example, the building guidance system 12 may display a list of the building features 22 (e.g., nearby building features) located within the threshold distance from the building guidance system 12. The displayed list of building features 22 may include the name of each building feature, the distance between the building guidance system 12 and the building feature 22, as well as other information or data associated with each building feature 22. Moreover, in some embodiments, the displayed list of building features may be updated in real time based on the absolute position of the building guidance system 12. Additionally, in some embodiments, the displayed list of building features may be updated upon user request. In this manner, the displayed list of building features may be continuously or selectively updated based on the absolute position of the building guidance system 12.

For example, if the list of building features 22 includes a cafeteria, the building guidance system 12 may receive user selection of a request to view a menu of the cafeteria. Additionally, if the list of building features 22 includes artwork, the building guidance system 12 may receive user selection of an option to view a detailed description of the artwork. Moreover, if the list of building features 22 includes a meeting room, the building guidance system 12 may receive user selection of an option to view meetings scheduled in the meeting room. In addition, the list of building features may be presented to the user via an alert indicative of the list of the building features. Moreover, as the building guidance system 12 is moved within or outside of the threshold range relative to each building feature 22, the list of the building features may be automatically updated and presented to the user. Thus, the building guidance system 12 enables the user to receive position-based information useful in navigating and interacting with the building. Additionally, the alerts may be provided to the user in any suitable form, such as audible alerts, visual alerts, tactile alerts, or the like to enable the user to receive information that may not otherwise be available to the user.

Figure 4:
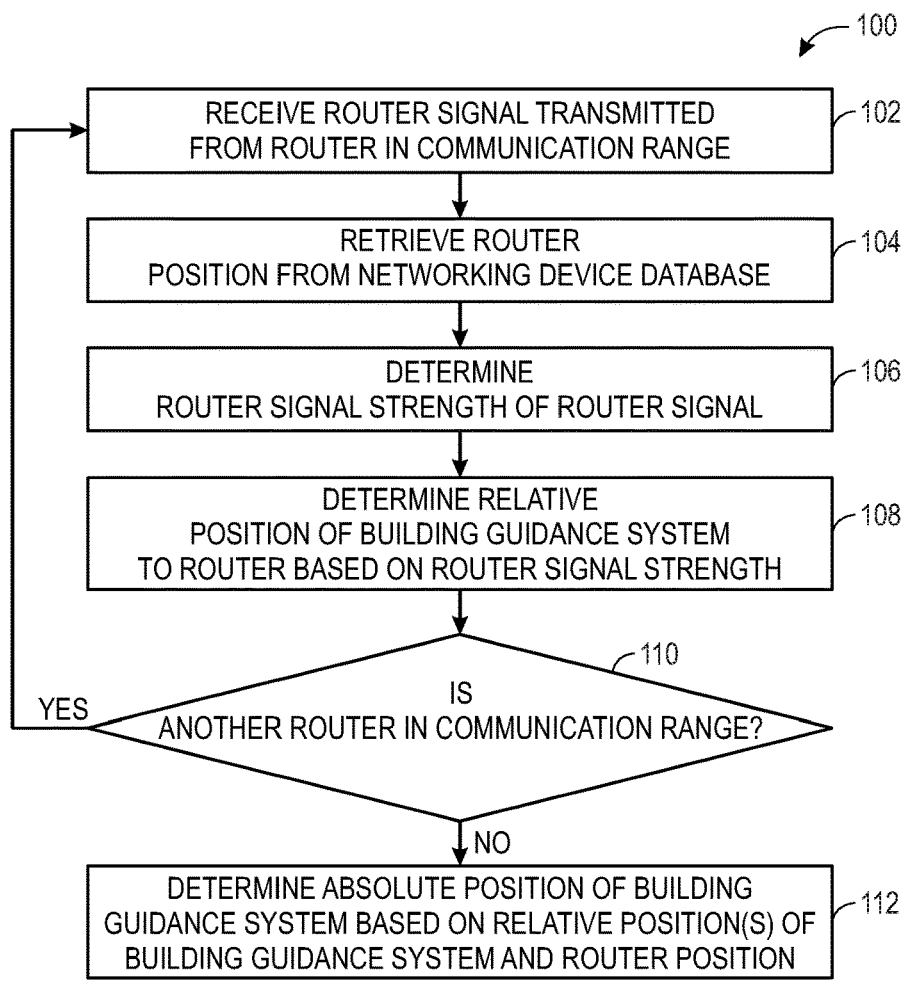
FIG. 4 illustrates a flow chart of a method for determining an absolute position of the building guidance system of FIG. 2 based on interactions with a router, in accordance with embodiments described herein.
Figure 5:
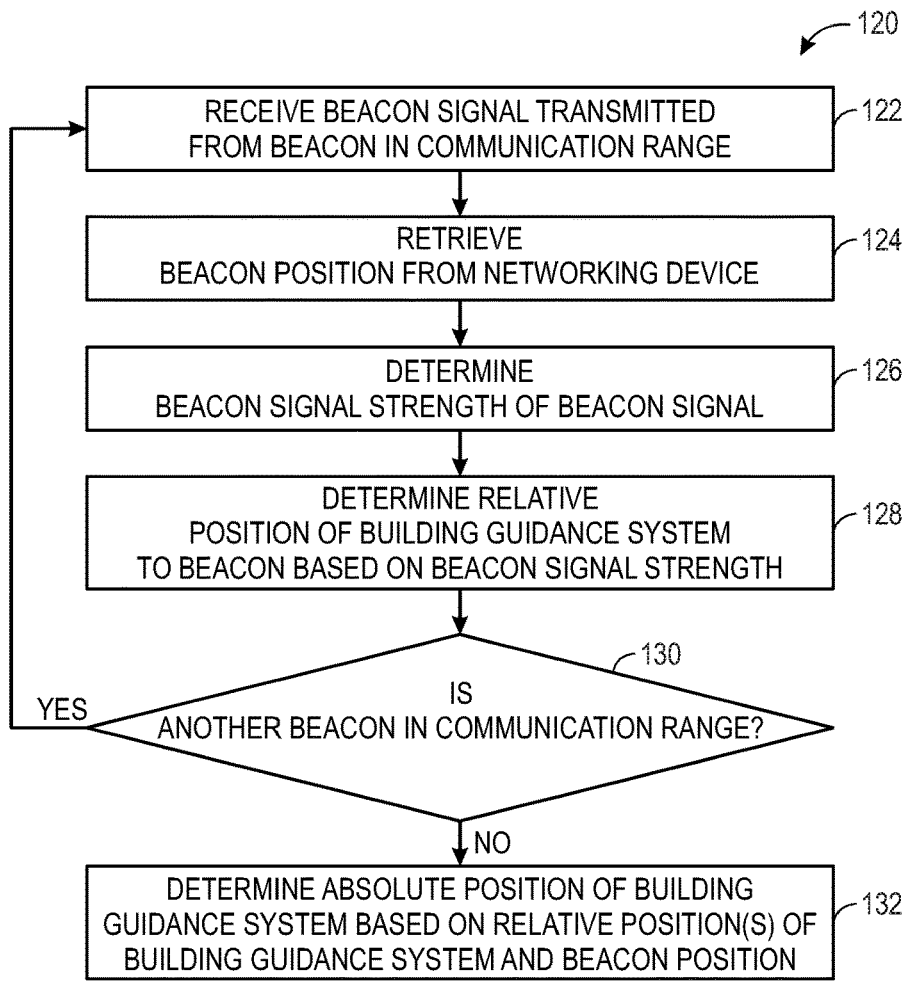
FIG. 5 illustrates a flow chart of a method for determining an absolute position of the building guidance system of FIG. 2 based on interactions with a communication beacon, in accordance with embodiments described herein.

FIGS. 4 and 5 are examples of how the building guidance system 12 may determine the absolute position of the building guidance system 12 based on interactions with the routers 18 and the communication beacons 20 respectively. More particularly, FIG. 4 illustrates a flow chart of a method 100 for determining the absolute position of the building guidance system 12 based on interaction with the routers 18, in accordance with embodiments described herein. Additionally, FIG. 5 illustrates a flowchart of a method 120 for determining the absolute position of the building guidance system 12 based on interaction with the communication beacons 20, in accordance with embodiments described herein. Indeed, although the following description of the methods 100, 120 are described in a particular order that each represent a particular embodiment, it should be noted that the methods 100, 120 may each be performed in any suitable order. Moreover, although the following description of the methods 100, 120 are described as being performed by the building guidance system 12, it should be noted that the methods 100, 120 may be performed by any suitable computing device. Further, although the following description of the methods 100, 120 are described separately herein, it is to be understood that the methods 100, 120 may additionally be performed together, simultaneously, near simultaneously, or in combination with another suitable method based on other suitable devices.

Referring now to FIG. 4, at block 102, the building guidance system 12 may receive a router signal transmitted from one or more routers 18 within communication range from the building guidance system 12. For example, the building guidance system 12 may determine that the building guidance system 12 is within communication range of the router 18 if the building guidance system 12 is able to communicatively couple to the router 18 to receive the router signal. In some embodiments, the building guidance system 12 may determine that the router 18 is within the communication range from the building guidance system 12 if the building guidance system 12 is within a threshold distance from the router 18 and able to receive the router signal. In one embodiment, the router signal includes identification information that the building guidance system 12 may use to query the networking device database 30 to identify the router 18.

Additionally, at block 104, the building guidance system 12 may retrieve a router position associated with the router 18 from the networking device database 30. In some embodiments, the building guidance system 12 queries the networking device database 30 based on the identification information for the router 18 provided by the router signal. The building guidance system 12 may therefore retrieve the router position from the networking device database 30. Although described with reference to querying the networking device database 30 based on the identification information included in the router signal, the building guidance system 12 may determine the router position by another suitable manner, such as by receiving the router position directly from the router 18.

In some embodiments, at block 106, the building guidance system 12 may also determine a router signal strength of the router signal. For example, the building guidance system 12 may receive the router signal and sense or measure the strength of the router signal via a signal strength sensor.

At block 108, the building guidance system 12 may determine a relative position of the building guidance system 12 to the router 18 based on the router signal strength and the router position. For example, the relative position of the building guidance system 12 may be a position of the building guidance system 12 relative to the router 18. In some embodiments, the building guidance system 12 may determine that the router signal strength is above a first threshold strength, thus indicating that the building guidance system 12 is within a first threshold distance from the router 18. Similarly, the building guidance system 12 may determine that the router signal's strength is outside the first strength threshold, but within a second strength threshold that is lower than the first signal strength threshold. As such, the building guidance system 12 may determine that the building guidance system 12 is outside the first threshold distance from the router 18, but within a second threshold distance from the router 18 that is larger than the first threshold distance. In this manner, the building guidance system 12 may determine a relative position (e.g., approximate distance) of the building guidance system 12 to the router 18.

At block 110, the building guidance system 12 may determine whether an additional router 18 is in the communication range. If the building guidance system 12 determines at block 110 that another router 18 is in the communication range, the building guidance system 12 may repeat blocks 102, 104, 106, and 108 for the additional router in the communication range. As such, in some embodiments, the building guidance system 12 determines the relative position of the building guidance system 12 to each router 18 within the communication range based on the router signal strength and the router position of each router 18 in the communication range.

Moreover, if the building guidance system 12 determines at block 110 that there is not an additional router 18 in the communication range, the building guidance system 12 may proceed to block 112 to determine an absolute position of building guidance system 12 based on the relative positions of building guidance system 12 to the routers 18 and the known router positions. More particularly, by retrieving the position of the router 18 within the building, and by determining the relative distance of the building guidance system 12 from the router 18, the building guidance system 12 may generally approximate a position of the building guidance system 12 within the building. For example, if the building guidance system 12 determines that that the building guidance system is 3 meters from a first router and 6 meters from a second router, and that the first router is located in a first portion of the building and the second router is in a second portion of the building, the building guidance system 12 may determine that the building guidance system 12 is more likely to be within the first portion of the building. Thus, the building guidance system 12 may triangulate or otherwise calculate the absolute position of the building guidance system 12 relative to the building. As previously discussed with reference to FIG. 1, the absolute position of the building guidance system 12 may be coordinates relating the building guidance system 12 to a position within the building. The building guidance system 12 may use the absolute position of the building guidance system 12 to provide position-based awareness and interactive information to the user of the building guidance system 12.

Moreover, as previously mentioned, the absolute position of the building guidance system 12 may additionally or alternatively be determined based on the communication beacons 20. Referring now to FIG. 5, at block 122, the building guidance system 12 may receive a communication beacon signal transmitted from a communication beacon 20 within communication range from the building guidance system 12. Indeed, in some embodiments, the building guidance system 12 may determine that the building guidance system 12 is within communication range of the communication beacon 20 if the building guidance system 12 is able to detect the communication beacon 20. In one embodiment, the communication beacon signal may include identification information that the building guidance system 12 may use to query the networking device database 30 to identify the communication beacon 20.

Additionally, at block 124, the building guidance system 12 may retrieve a position associated with the communication beacon 20 from the networking device database 30. In some embodiments, the building guidance system 12 queries the networking device database 30 based on the identification information for the communication beacon 20 provided by the communication beacon signal to retrieve the communication beacon position from the networking device database 30. In some embodiments, the building guidance system 12 may determine the communication beacon position by another suitable manner, such as by receiving the communication beacon position directly from the communication beacon 20.

In some embodiments, at block 126, the building guidance system 12 may determine a communication beacon signal strength of the communication beacon signal. For example, the building guidance system 12 may receive the communication beacon signal from the communication beacon 20, and sense or measure the strength of the communication beacon signal via a signal strength sensor.

At block 128, the building guidance system 12 may determine a relative position of the building guidance system 12 to the communication beacon 20 based on the communication beacon signal strength and the communication beacon position. For example, the relative position of the building guidance system 12 may be a position of the building guidance system 12 relative to the communication beacon 20, similar to the discussion above with reference to block 108 of FIG. 4.

Next, at block 130, the building guidance system 12 may determine whether an additional communication beacon 20 is able to be detected (e.g., in the communication range). If the building guidance system 12 determines at block 130 that an additional communication beacon 20 is able to be detected, the building guidance system 12 may repeat blocks 122, 124, 126, and 128 for the additional, detected communication beacon. As such, in some embodiments, the building guidance system 12 determines the relative position of the building guidance system 12 based on the communication beacon signal strength and the communication beacon position of each communication beacon 20.

Moreover, if the building guidance system 12 determines at block 130 that there an additional communication beacon 20 is not able to be detected, the building guidance system 12 may proceed to block 132 to determine an absolute position of building guidance system 12 based on the relative positions of building guidance system 12 to the communication beacons 20 and the known communication beacon positions. More particularly, by retrieving the position of the communication beacon 20 within the building, and by determining the relative distance of the building guidance system 12 from the communication beacons 20, the building guidance system 12 may generally approximate a position of the building guidance system 12 within the building. As such, the building guidance system 12 may use the absolute position of the building guidance system 12 to provide position-based awareness and interactive information to the user of the building guidance system 12.

Figure 6:
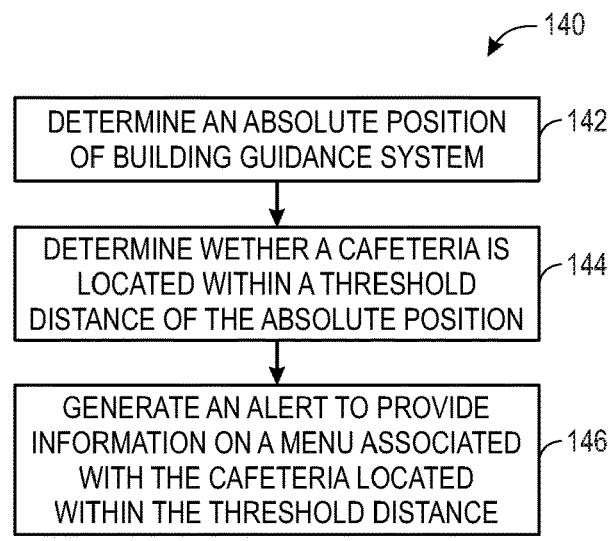
FIG. 6 illustrates a flow chart of a method for generating an alert via the building guidance system of FIG. 2 to provide information regarding a menu of a cafeteria, in accordance with embodiments described herein.

With the foregoing in mind, FIGS. 6-11 provide additional details related to the various uses of the building guidance system 12. Indeed, the examples described herein are not intended to limit the uses of the building guidance system 12, and instead include a subset of the possible uses of the building guidance system 12 that will be apparent to those skilled in the art. FIG. 6 illustrates a flow chart of a method 140 for generating an alert to provide information regarding a menu of a cafeteria via the building guidance system 12, in accordance with embodiments described herein. Although the following description of the method 140 is described in a particular order, which represents a particular embodiment, it should be noted that the method 140 may be performed in any suitable order. Moreover, although the following description of the method 140 is described as being performed by the building guidance system 12, it should be noted that the method 140 may be performed by any suitable computing device.

Referring now to FIG. 6, at block 142, the building guidance system 12 may determine an absolute position of the building guidance system 12. The building guidance system 12 may determine the absolute position of itself by the method 100 of FIG. 4, the method 120 of FIG. 5, another suitable method, or any combination thereof. Indeed, the absolute position of the building guidance system 12 may include latitude, longitude, and elevation coordinates, Cartesian coordinates, or another suitable system for objectively determining the position of the building guidance system 12 relative to the building.

At block 144, the building guidance system 12 may determine whether a cafeteria is located within a threshold distance of the absolute position of the building guidance system 12. For example, by querying the building information databases 32 based on the absolute position of the building guidance system 12, the building guidance system 12 may determine relative distances between the building guidance system 12 and cafeterias of the building. Then, the building guidance system 12 may determine a list of cafeterias that have relative distances from the building guidance system 12 that are within the threshold distance. Moreover, the building guidance system 12 may also query the building information databases 32 to determine data indicative of menus associated with the cafeterias within the threshold distance. In some embodiments, the building guidance system 12 may scan the surrounding area for communication beacon signals from communication beacons 20 that may provide information related to nearby cafeterias.

After identifying a nearby cafeteria, at block 146, the building guidance system 12 may generate an alert to provide information regarding a menu associated with the cafeteria located within the threshold distance. The building guidance system 12 may present the alert in any suitable visual, audible, and/or tactile form. For example, in some embodiments, the alert indicative of the menu is displayed on a screen, read aloud, or any suitable combination thereof. Moreover, the building guidance system 12 may present the alert automatically in response to identifying the cafeteria or based upon user selection of a request to view the menu. Moreover, the alert may be indicative of a list of cafeterias that are within the threshold distance. In some embodiments, the list of the cafeterias that are within the threshold distance is automatically updated when the building guidance system 12 moves within or outside of the threshold distance relative to the cafeterias.

Figure 7:
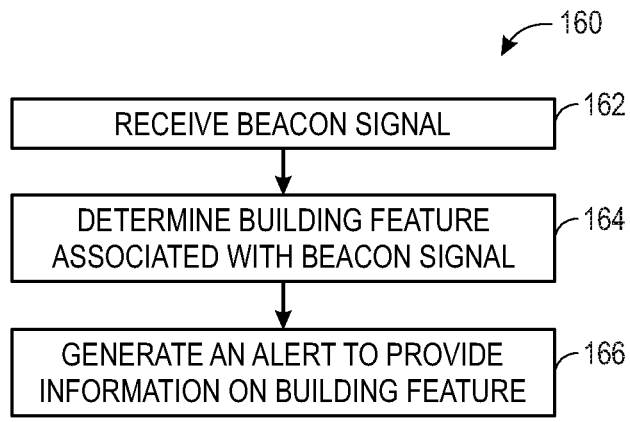
FIG. 7 illustrates a flow chart of a method for generating an alert via the building guidance system of FIG. 2 to provide information regarding building features based on communication with a communication beacon, in accordance with embodiments described herein.

Additionally, FIG. 7 illustrates a flow chart of a method 160 for generating an alert to provide information regarding building features based on communication between the communication beacon 20 and the building guidance system 12, in accordance with embodiments described herein. Although the following description of the method 160 is described in a particular order, which represents a particular embodiment, it should be noted that the method 160 may be performed in any suitable order. Moreover, although the following description of the method 160 is described as being performed by the building guidance system 12, it should be noted that the method 160 may be performed by any suitable computing device.

Referring now to FIG. 7, at block 162, the building guidance system 12 may receive a beacon signal from the communication beacon 20. In some embodiments, the communication beacon 20 may be disposed in, disposed on, or disposed near a building feature 22. For example, the building feature 22 may be a landmark within the building, such as an entrance of the building, a stairwell of the building, a conference room of the building, a restroom of the building, or another suitable feature of the building to which users in the building may want to navigate.

In some embodiments, at block 164, the building guidance system 12 may determine a building feature 22 that is associated with the beacon signal. For example, the beacon signal may include a unique identification number that the building guidance system 12 may use to query the building information database 32. Using the building information database 32, the building guidance system 12 may identify the building features 22 associated with the communication beacon 20 as well as any desired information, data, or interactive features associated with the communication beacon 20. In some embodiments, the beacon signal may include one or more packets of information or data related to the building feature 22. Moreover, in some embodiments, the building information database 32 includes information in multiple formats, such as audible information, visual information, tactile information, or the like. Indeed, each communication beacon 20 may be associated in the building information database 32 with an audio file, a visual image, or a combination thereof. In certain embodiments, the building guidance system 12 may also determine a relative or absolute position of the building guidance system 12 based on the beacon signal, as described above.

Further, at block 166, the building guidance system 12 may generate an alert to provide information regarding the building feature associated with the communication beacon 20. The building guidance system 12 may present the alert in any suitable visual, audible, or tactile form. For example, in some embodiments, the alert is displayed on a screen, read aloud, or any suitable combination thereof. In some embodiments, the alert is indicative of a position of the building feature 22, a description of the building feature 22, or any other suitable data associated with the building feature 22, as discussed above with reference to FIG. 1. In some embodiments, the alert may be indicative of a list of building features that are associated with detectable communication beacons 20. In some embodiments, the list of the building features that are associated with detectable communication beacons 20 is automatically updated when the building guidance system 12 moves within or outside of the threshold distance relative to the building features 22.

In some embodiments, the data associated with the building feature 22 may be a song or audio file. Indeed, a user may select songs to associate with certain communication beacons 20, such as communication beacons 20 associated with entrances of regions or subparts of the building. For example, a first communication beacon 20 may be associated with an entrance to a first region of the building, and a second communication beacon 20 may be associated with an entrance to a second region of the building. Then, within the building information database 32, the building manager may associate and store a first song with the first communication beacon 20 and associate a second song with the second communication beacon 20. Thus, the building guidance system 12 may receive the beacon signal from the first communication beacon 20, and then query the building information database 32 based on the received beacon signal. Then, the building guidance system 12 may retrieve data that indicates that the first communication beacon is associated with the first region of the building and with the first song. The building guidance system 12 may then generate the alert to inform the user that the user is in the first region of the building. Indeed, in some embodiments, the alert is presented by playing the first song to the user via the audio component 62. Similarly, if the user then takes the building guidance system 12 to the second region of the building, the building guidance system 12 may perform the method 160 to generate the alert indicative of the second song associated with the second region of the building.

Although the above discussion is directed to presenting alerts of songs associated with the communication beacons 20, it is to be understood that other suitable unique identifiers, such as photographs, icons, visualizations, or the like may be additionally or alternatively provided to the users. Indeed, based on user settings, the building guidance system 12 may present specialized data or combinations of data to the user to enable them to more easily navigate the building. Thus, the building guidance system 12 may provide detailed, position-based information to enable users to identify nearby building features, thus increasing the ease of navigating the building.

Moreover, in some embodiments, the building guidance system 12 may be employed to provide directions (e.g., turn-by-turn directions) between certain building features 22. That is, the user of the building guidance system 12 may provide user input indicative of a destination building feature 22. In such embodiments, the building guidance system 12 may then query the building information database 32 to retrieve the position of the destination building feature 22. In some embodiments, based on the absolute position of the building guidance system 12, the building guidance system 12 may also retrieve a log of directions between the building guidance system 12 and the destination building feature 22. Then, the building guidance system 12 may generate an alert to inform the user of the directions between the absolute position and the destination building feature. Moreover, the building guidance system 12 may provide feedback on movement of the user, such as alerts indicative of facing an incorrect direction, making an incorrect turn, being on an incorrect floor of the building, or the like.

Further, in some embodiments, the building guidance system 12 may employ the other electronic devices 16 to provide the alerts. For example, if the building guidance system 12 has directed the user to pass by a large display screen (e.g., other electronic device 16) located within a threshold distance, the building guidance system 12 may send instructions to the large display screen to display an alert indicative of the next turn the user should make. In some embodiments, the alert displayed on the large display screen also includes identification information for the user, such as initials of the user, a name of the user, a number associated with the user, a color selected by the user, a sound selected by the user (e.g., if the display is coupled to an audio device), or the like. In this manner, the building guidance system 12 may provide more interactive instructions to the user via components and devices located within the building. Similarly, the building guidance system 12 may instruct audio devices of the other electronic devices 16 to transmit alerts to the user when the user is within a threshold distance of the other electronic devices 16.

Figure 8:
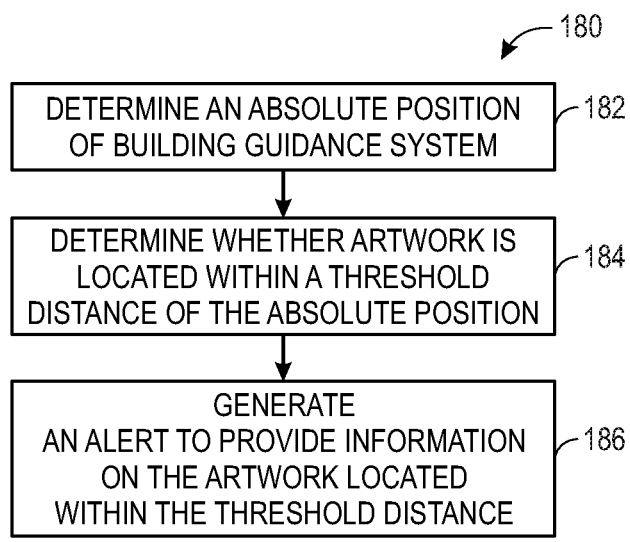
FIG. 8 illustrates a flow chart of a method for generating an alert via the building guidance system of FIG. 2 to provide information regarding artwork, in accordance with embodiments described herein.

FIG. 8 illustrates a flow chart of a method 180 for generating an alert via the building guidance system 12 to provide information regarding artwork, in accordance with embodiments described herein. Indeed, in some buildings, artwork may not be accompanied by corresponding descriptions, artists, or the like, or the corresponding information may only be available visually. Although the following description of the method 180 is described in a particular order, which represents a particular embodiment, it should be noted that the method 180 may be performed in any suitable order. Moreover, although the following description of the method 180 is described as being performed by the building guidance system 12, it should be noted that the method 180 may be performed by any suitable computing device.

Referring now to FIG. 8, at block 182, the building guidance system 12 may determine an absolute position of the building guidance system 12. Indeed, as discussed above, the absolute position of the building guidance system 12 may include coordinates indicative of a position of the building guidance system 12 within or relative to the building. The absolute position may be determined by any suitable method, such as the method 100 of FIG. 4, the method 120 of FIG. 5, another suitable locating method, or any combination thereof.

In some embodiments, at block 184, the building guidance system 12 may determine whether artwork is located within a threshold distance of the absolute position of the building guidance system 12. For example, the building guidance system 12 may query the building information database 32 to determine positions of the artwork within the building. Then, the building guidance system 12 may determine a distance between the artwork and the absolute position of the building guidance system 12. Moreover, the building guidance system 12 may compare the distance between the artwork and the absolute position of the building guidance system 12 to a threshold distance to determine whether the artwork is within the threshold distance. Moreover, in some embodiments, the building guidance system 12 may additionally or alternatively determine the position of the artwork by receiving a beacon signal from a communication beacon 20 associated with the artwork and then querying the building information database 32 based on the beacon signal. Further, in some embodiments, the building guidance system 12 may receive the beacon signal from the communication beacon 20 that may include identification information and a position associated with the communication beacon 20.

Further, at block 186, the building guidance system 12 may generate an alert to provide information regarding the artwork located within the threshold distance. The building guidance system 12 may present the alert in any suitable visual, audible, and/or tactile form. In some embodiments, the alert includes information that the building guidance system 12 retrieves from the building information database 32. For example, the building guidance system 12 may retrieve data such as identification information related to the artwork, a description of the artwork, an artist of the artwork, a website associated with the artwork, or any other suitable information related to the artwork. Moreover, the alert may be indicative of a list of artwork that is within the threshold distance. In some embodiments, the list of the artwork that is within the threshold distance is automatically updated when the building guidance system 12 moves within or outside of the threshold distance relative to the artwork. In this manner, the building guidance system 12 may provide information related to the artwork to users when the users are near the artwork. Thus, the building guidance system 12 may provide position-based information related to nearby artwork to increase an accessibility of the artwork to the users.

Figure 9:
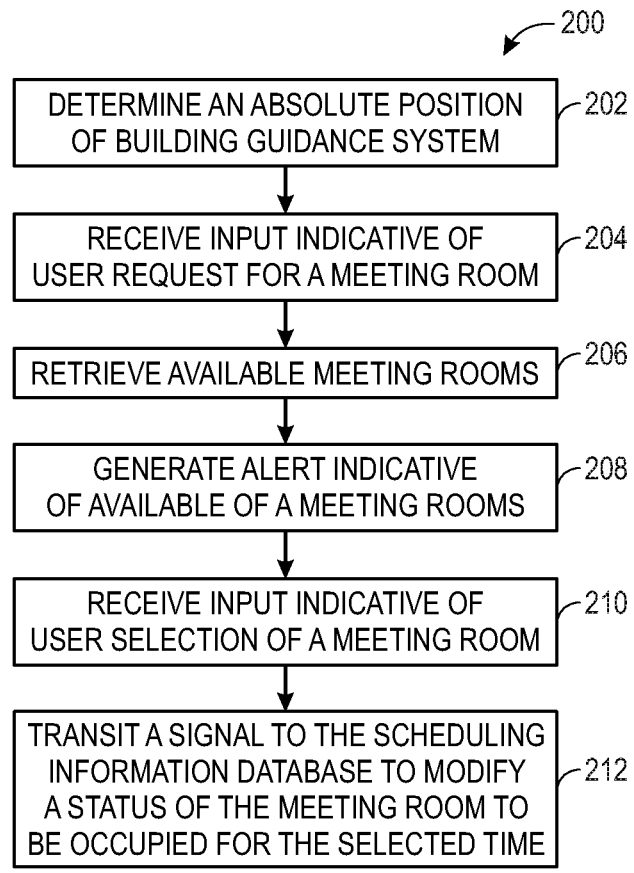
FIG. 9 illustrates a flow chart of a method for modifying a status of a meeting room via the building guidance system of FIG. 2, in accordance with embodiments described herein.

FIG. 9 illustrates a flow chart of a method 200 for modifying a status of a meeting room for a selected time via the building guidance system 12, in accordance with embodiments described herein. Indeed, in some embodiments, users traversing a building may wish to conduct a meeting in a nearby, unoccupied meeting room. However, such information may typically only be available by searching for each meeting room one by one on a web-service application. Thus, the method 200 uses the absolute position of the building guidance system 12 to identify and allow meetings to be scheduled in nearby, unoccupied meeting rooms. Although the following description of the method 200 is described in a particular order, which represents a particular embodiment, it should be noted that the method 200 may be performed in any suitable order. Moreover, although the following description of the method 200 is described as being performed by the building guidance system 12, it should be noted that the method 200 may be performed by any suitable computing device.

Referring now to FIG. 9, at block 202, the building guidance system 12 may determine its absolute position within the building. Indeed, as discussed above, the absolute position of the building guidance system 12 may include coordinates indicative of a position of the building guidance system 12 within or relative to the building. The absolute position may be determined by any suitable method, such as the method 100 of FIG. 4, the method 120 of FIG. 5, another suitable locating method, or any combination thereof.

Moreover, at block 204, the building guidance system 12 may receive input indicative of user request for a meeting room. The input may be received via the touch-screen component of the display 60, via a microphone of the building guidance system 12, or by another suitable component (e.g., a component coupled to the I/O ports 58). In some embodiments, the user input may request a meeting room having certain features, such as a minimum user capacity, a projector, a telephone, an outlet, and/or other desired components.

At block 206, the building guidance system 12 may retrieve data regarding available meeting rooms. For example, the building guidance system 12 may query the scheduling information database 34 to retrieve positions of meeting rooms and statuses of the meeting rooms for various time periods. Thus, the building guidance system 12 may retrieve a list of meeting rooms that have an available status for a current time period. Moreover, in some embodiments, the building guidance system 12 retrieves meeting rooms that are within a threshold distance of the absolute position of the building guidance system 12. Additionally, the list of meeting rooms that are within the threshold distance of the absolute position of the building guidance system 12 may be automatically updated when the building guidance system 12 moves within or outside of the threshold distance relative to the meeting rooms. Additionally, in embodiments in which the user input requested certain features, the building guidance system 12 may filter the list of the available meeting rooms to exclude meeting rooms that do not include the certain features. Moreover, in some embodiments, the other electronic devices 16 within the building, such as a projected display, a wall-mounted monitor, or the like may display the statuses of each meeting room, such that nearby users may view the other electronic devices 16 to quickly select an available meeting room.

At block 208, the building guidance system 12 may generate an alert indicative of the available meeting rooms. The available meeting rooms may be within the threshold distance, include the certain features requested by the user, or a combination thereof. Additionally, the building guidance system 12 may present the alert in any suitable visual, audible, and/or tactile form. In some embodiments, the alert is a visually displayed list of the meeting rooms. Moreover, in some embodiments, the alert is audible information that is relayed to the user, such as an audio file that speaks the list of the meeting rooms.

Additionally, at block 210, the building guidance system 12 may receive input indicative of user selection of a meeting room from the available meeting rooms. For example, the user may provide input to the building guidance system 12 via an audible command or a selection made on the touch screen.

Moreover, at block 212, the building guidance system 12 may transmit a signal to the scheduling information database 34 to modify a status of the selected meeting room to be occupied or unavailable for the selected time. As such, the building guidance system 12 may enable the user to schedule meetings in nearby and available meeting rooms that include desired features. In this manner, the building guidance system 12 may provide more accessible, position-based meeting scheduling to users.

Additionally, in some embodiments, by knowing the absolute position of the building guidance system 12 and the position of the selected meeting room, the building guidance system 12 may determine an expected arrival time that the user will reach the selected meeting room. In some embodiments, the building guidance system 12 employs a default average walking speed or an average walking speed provided by the user to determine the time it will take the user to traverse the distance between the absolute position of the building guidance system 12 and the selected meeting room. Moreover, if the user of the building guidance system 12 has invited other users to the meeting, the building guidance system 12 associated with the other users may similarly calculate an expected arrival time for the other users to arrive at the selected meeting room. In some embodiments, the building guidance systems 12 of the user and the other users may generate alerts to notify each user if one or more of the users are not expected to arrive before the scheduled meeting, such that meeting activities may be delayed or otherwise modified. Additionally, this function of the building guidance system 12 may be extended to other meetings associated with the user, such that the building guidance system 12 may generate alerts to notify users of the expected arrival times, expected delays, and the like for any meeting for which the user has been invited to, accepted, tentatively accepted, or the like.

FIG. 10 illustrates a flow chart of a method 220 for generating an alert via the building guidance system 12 to provide information regarding nearby users, in accordance with embodiments described herein. For example, users in a building may not be able to see or otherwise perceive a presence of other users within the building. Although the following description of the method 220 is described in a particular order, which represents a particular embodiment, it should be noted that the method 220 may be performed in any suitable order. Moreover, although the following description of the method 220 is described as being performed by the building guidance system 12, it should be noted that the method 220 may be performed by any suitable computing device.

Referring now to FIG. 10, at block 222, the building guidance system 12 may receive identification data from surrounding devices (e.g., additional computing devices). The surrounding devices may be other building guidance systems, other computing devices, or the like that are associated with other users of the building. The surrounding devices may transmit the identification data directly to the building guidance system 12 or to a gateway or intermediate component that then transmits the identification data to the building guidance system 12.

At block 224, the building guidance system 12 may identify users associated with the surrounding devices. For example, in some embodiments, signals from the surrounding devices may include data indicative of the users associated with the surrounding devices. Further, in certain embodiments, the signals from the surrounding devices may be used to query the building information database 32 to retrieve the identities of the users of the surrounding devices therefrom. In some embodiments, the building guidance system 12 may only identify other users that are within a threshold distance from the user of the building guidance system 12 (e.g., nearby users).

Moreover, at block 226, the building guidance system 12 may generate an alert to provide information regarding nearby users. The building guidance system 12 may present the alert in any suitable visual, audible, and/or tactile form. In certain embodiments, the alert includes a name of the nearby users, a job title of the nearby users, an absolute position of the nearby users, or the like. In some embodiments, the alert includes a relative position of the nearby users to the building guidance system 12, such that the user of the building guidance system 12 may know how close the nearby users are to the user of the building guidance system 12. Moreover, the alert may be indicative of a list of users that are within the threshold distance. In some embodiments, the list of the users that are within the threshold distance is automatically updated when the building guidance system 12 moves within or outside of the threshold distance relative to surrounding devices associated with the other users. In this manner, the building guidance system 12 may enable users to be aware of other users within the building, such that the users are able to more easily navigate to the users or navigate around the users.

FIG. 11 illustrates a flow chart of a method 240 for generating a visualization via the building guidance system 12 to display positions of devices within the building, in accordance with embodiments described herein. For example, with an occurrence of a potential disruptive event, it may be useful to gather information related to the locations of building occupants in a building associated with the potential disruptive event. The potential disruptive event may include a natural event (e.g., flood, hurricane, earthquake, fire, etc.), a human-based event (e.g., hostile person in the building), or the like. During such potential disruptive events, emergency responders and building managers may desire to know a position of each user within the building. However, such information may be slow or otherwise difficult to acquire. Although the following description of the method 240 is described in a particular order, which represents a particular embodiment, it should be noted that the method 240 may be performed in any suitable order. Moreover, although the following description of the method 240 is described as being performed by the computing device 14, it should be noted that the method 240 may be performed by any suitable computing device.

Referring now to FIG. 11, at block 242, the computing device 14 may receive an indication that potential disruptive event may be present in a building. For example, the building manager or the emergency responders may provide input to the computing device 14 to indicate that a potential disruptive event is likely to occur or is occurring. In some embodiments, the computing device 14 may update the building information database 32 to include information regarding the potential disruptive event. The building guidance systems 12 of various users may then retrieve the indication from the building information database 32 and provide an alert to the users regarding the potential disruptive event, instructions related to securing oneself during the event, and the like.

In some embodiments, at block 244, the computing device 14 may receive absolute positions of other building guidance systems 12 within the building, near the building, or otherwise associated with the building. In some embodiments, each building guidance system 12 uploads the absolute position of itself to the building information database 32. Then, upon indication of the potential disruptive event, the computing device 14 may retrieve the last known absolute position of the other building guidance systems 12. Moreover, if the other building guidance systems 12 remain online, the other building guidance systems 12 may continue to upload their absolute position such that the building guidance system 12 may retrieve continuously updated absolute positions of the other building guidance systems 12.

Further, at block 246, the computing device 14 may generate a visualization of the absolute positions of the other building guidance systems 12. For example, the computing device 14 may present a map of the building that includes markers or other visualizations displayed at a position that corresponds to the absolute position of the other building guidance systems 12. Moreover, in some embodiments, the visualization includes a list of the absolute positions of the other building guidance systems 12. In this manner, upon indication of a potential disruptive event, the building guidance system 12 may be employed to quickly generate a visualization of other building guidance systems 12 within or near the building to assist in completing emergency protocols (e.g., accounting for each user associated with the building).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   a plurality of display devices, wherein each display device of the plurality of display devices is coupled as a fixture of a building; and
   a processor communicatively coupled to the plurality of display devices and a computing device, wherein the processor is configured to:
   determine an absolute position of the computing device within the building based on communications between the computing device and one or more navigation devices of the building;
   receive a signal indicative of selection of a building feature of one or more building features of the building from the computing device;
   generate a list of directions between the absolute position of the computing device and the building feature based on a query of a database associated with the one or more building features;
   determine whether the absolute position of the computing device is located within a first threshold distance of a first display device of the plurality of display devices;
   transmit a first alert configured to cause the first display device to display a first portion of the list of directions in response to determining that the absolute position of the computing device is located within the first threshold distance of the first display device;
   determine whether the absolute position of the computing device is located within a second threshold distance of a second display device of the plurality of display devices; and
   transmit a second alert configured to cause the second display device to display a second portion of the list of directions in response to determining that the absolute position of the computing device is located within the second threshold distance of the second display device, wherein the second portion of the list of directions is subsequent to the first portion of the list of directions.

2. The system of claim 1, wherein the one or more navigation devices comprise one or more routers, one or more communication beacons, or both, and wherein the processor is configured to determine the absolute position of the computing device based on a first data set acquired from the one or more routers, a second data set acquired from the one or more communication beacons, or a combination thereof.

3. The system of claim 1, wherein the processor is configured to receive identification information from a communication beacon within the building, and wherein the processor is configured to determine the absolute position of the computing device based on a query of an additional database comprising the identification information of the communication beacon and an absolute position of the communication beacon.

4. The system of claim 1, wherein the processor is configured to determine the absolute position of the computing device based on a first distance between the computing device and a first router of the building and a second distance between the computing device and a second router of the building.

5. The system of claim 1, wherein the building feature comprises a cafeteria of the building, and wherein the processor is configured to generate an additional alert configured to cause the computing device to display information comprising a menu associated with the cafeteria.

6. The system of claim 1, wherein the building feature comprises one or more meeting rooms of the building, and wherein the processor is configured to generate an additional alert configured to cause the computing device to display information comprising a schedule of meetings associated with the one or more meeting rooms.

7. The system of claim 6, wherein the processor is configured to:
   receive a first input indicative of a user request to schedule a meeting within an available meeting room of the one or more meeting rooms;
   identify one or more available meeting rooms of the one or more meeting rooms based on a query of an additional database comprising scheduling information associated with the one or more meeting rooms;
   cause the computing device to display an indication of the one or more available meeting rooms on the computing device;
   receive a second input indicative of a user selection of one of the one or more available meeting rooms, wherein the one of the one or more available meeting rooms is the building feature; and
   transmit an additional signal to change a status associated with the one of the one or more available meeting rooms to indicate that the one of the one or more available meeting rooms is unavailable for a time period.

8. The system of claim 1, wherein the processor is configured to:
- determine an additional absolute position of a plurality of additional computing devices within the building; and
- generate a visualization indicative of a respective relative position of each additional computing device of the plurality of additional computing devices with respect to the computing device for display via the computing device.

9. The system of claim 1, wherein the alert is configured to cause the first display device to present unique user identification information indicative of an identity of a user of the computing device adjacent to the first portion of the list of directions.

10. A method, comprising:
- determining, via a processor communicatively coupled to a computing device, one or more relative positions of the computing device to one or more routers, one or more communication beacons, or a combination thereof;
- determining, via the processor, an absolute position of the computing device within a building based on the one or more relative positions;
- receiving, via the processor, a signal indicative of selection of a building feature of one or more building features of the building from the computing device;
- querying, via the processor, a database comprising data associated with one or more building features of the building based on the absolute position;
- generating, via the processor, a list of directions between the absolute position and the building feature based on the query, wherein the list of directions is configured to direct a user toward the building feature;
- determining, via the processor, whether the absolute position is located within a first threshold distance of a first display device of a plurality of display devices, wherein each display device of the plurality of display devices is coupled as a fixture of the building;
- transmitting, via the processor, a first visualization for display on the first display device in response to determining that the absolute position is located within the first threshold distance of the first display device, wherein the first visualization comprises a first portion of the list of directions;
- determining, via the processor, whether the absolute position is located within a second threshold distance of a second display device of the plurality of display devices; and
- transmitting, via the processor, a second visualization for display on the second display device in response to determining that the absolute position is located within the second threshold distance of the second display device, wherein the second portion of the list of directions is subsequent to the first portion of the list of directions.

11. The method of claim 10, wherein the building feature comprises artwork displayed in the building, a cafeteria of the building, or a meeting room of the building, wherein the first portion of the list of directions indicates a first user instruction to move the absolute position closer to the building feature, and wherein the second portion of the list of directions indicates a second user instruction to be performed after the first user instruction to move the absolute position closer to the building feature.

12. The method of claim 10, wherein the building feature comprises a second region of a plurality of regions of the building, wherein each region of the plurality of regions is associated with a respective audio file based on input from a building manager, and wherein the method comprises:
- determining, via the processor, that the absolute position of the computing device is within a first region of the plurality of regions;
- instructing, via the processor, the computing device to output a first audio file indicative of a first identity of the first region; and
- instructing, via the processor, the computing device to output a second audio file indicative of a second identity of the second region in response to determining that the absolute position has moved within the second region.

13. The method of claim 12, wherein each region of the building is associated with a respective audible song.

14. The method of claim 10, wherein determining the absolute position of the computing device comprises:
- determining a first relative distance between the computing device and a first router or a first communication beacon;
- determining a second relative distance between the computing device and a second router or a second communication beacon; and
- determining the absolute position of the computing device based on the first relative distance and the second relative distance.

15. A non-transitory computer-readable medium comprising computer-executable instructions configured to, when executed, cause a processor to:
- determine an absolute position of a computing device within a building;
- receive input indicative of a request to schedule a meeting in one of one or more meeting rooms located within a room threshold distance of the absolute position;
- query a first database based on the absolute position to identify at least one of the one or more meeting rooms located within the room threshold distance from the computing device;
- query a second database based on the at least one of the one or more meeting rooms to determine an availability of the one or more meeting rooms;
- generate an alert for display via the computing device, wherein the alert is indicative of the availability of the one or more meeting rooms;
- receive input indicative of a selection of one of the one or more meeting rooms;
- generate a list of directions between the absolute position and the one of the one or more meeting rooms;
- determine whether the absolute position is within a first threshold distance from a first display device of a plurality of display devices, wherein each display device of the plurality of display devices is coupled to the building as a fixture;
- transmit a first signal configured to cause the first display device to display a first portion of the list of directions in response to determining that the absolute position is within the first threshold distance of the first display device;
- determine whether the absolute position is within a second threshold distance from a second display device of the plurality of display devices; and
- transmit a second signal configured to cause the second display device to display a second portion of the list of directions in response to determining that the absolute position is within the second threshold distance of the second display device, wherein the second portion of the list of directions is subsequent to the first portion of the list of directions.

16. The non-transitory computer-readable medium of claim 15, wherein the computer-executable instructions are configured to cause the processor to present the alert through the computing device as audible information, tactile information, or both.

17. The non-transitory computer-readable medium of claim 15, wherein the computer-executable instructions are configured to cause the processor to change a status of the one or more meeting rooms to indicate that the one of the one or more meeting rooms is occupied in response to receiving the input indicative of the selection.

18. The non-transitory computer-readable medium of claim 15, wherein the computer-executable instructions are configured to cause the processor to:

receive identification information from one or more routers or one or more communication beacons within a communication range of the computing device; and determine the absolute position based on identification information.

19. The non-transitory computer-readable medium of claim 15, wherein the alert is indicative of identification information related to the one or more meeting rooms, one or more locations of the one or more meeting rooms, one or more communication beacons associated with the one or more meeting rooms, one or more statuses associated with the one or more meeting rooms, or a combination thereof.

20. The non-transitory computer-readable medium of claim 15, wherein the computer-executable instructions are configured to cause the processor to:

receive additional input indicative of one or more requested room features of the one or more meeting rooms, wherein the one or more requested room features comprise available equipment; and query the second database based on the one or more requested room features to filter the at least one of the one or more meeting rooms to any matching meeting rooms that have the one or more requested room features.

* * * * *